United States Patent [19]
Kojima et al.

[11] Patent Number: 5,880,981
[45] Date of Patent: Mar. 9, 1999

[54] METHOD AND APPARATUS FOR REDUCING THE POWER CONSUMPTION IN A PROGRAMMABLE DIGITAL SIGNAL PROCESSOR

[75] Inventors: Hirotsugu Kojima, Foster City; Avadhani Shridhar, Sunnyvale, both of Calif.

[73] Assignee: Hitachi America, Ltd., N.Y.

[21] Appl. No.: 695,617

[22] Filed: Aug. 12, 1996

[51] Int. Cl.$^6$ .............................. G06F 7/38; G06F 7/52
[52] U.S. Cl. .............................. 364/736.02; 364/754.01
[58] Field of Search .................... 364/724.12, 724.16, 364/736.04, 750.5, 754.01, 758, 759, 760.01–760.04, 736.02, 745.03, 745.04, 748.04, 748.09

[56] References Cited

U.S. PATENT DOCUMENTS

| | | | |
|---|---|---|---|
| 4,498,135 | 2/1985 | Caudel ............................... | 395/800.33 |
| 4,876,660 | 10/1989 | Owen et al.. ........................ | 364/750.5 |
| 5,045,993 | 9/1991 | Murakami et al. .................... | 395/583 |
| 5,333,119 | 7/1994 | Raatz et al. ........................ | 364/760.03 |
| 5,448,744 | 9/1995 | Eifert et al. ......................... | 395/800.4 |
| 5,513,374 | 4/1996 | Baji ................................... | 395/846 |
| 5,661,673 | 8/1997 | Davis ................................. | 364/760.01 |

OTHER PUBLICATIONS

Mussol et al. High–level Synthesis Techniques for Reducing the Activity of Functional Units; Proceedings of International Symposium on Low Power Design, ACM–SIGDA and IEEE–CAS Apr. 23, 1995–Apr. 26. 1995.
On Parallel Digital Multipliers, L. Dadda; Alta Frequenza, Oct. 1976, vol. XLV.
Some Schemes for Parallel Multipliers, L Dadda; Alta Frequenze, May 1965, vol. XXXIV.
Pentium Processor System Architecture, $2^{nd}$ Ed., Chapter 9, Anderson et al., 1995 MindShare, Inc.
Texas Instruments "TMS320C4X User's Guide", Software Applications, 1993.

High–level Synthesis Techniques for Reducing the Activity of Functional Units; Musoll et al., Proceedings of International Symposium on Low Power Design, sponsored by ACM–SIGDA and IEEE–CAS, Apr. 23, 1995 –Apr. 26, 1995.
AT&T, "WE DSP32 and DSP32C Application Software Library"; Feb. 1989.
Low Power Architecture Design and Compilation Techniques for High–Performance Processors, Ching–Long Su et al., IEEE 1994.
Architectures and Circuits for Parallel Digital Multipliers for Low Power, High Performance Applications, Lee et al., Dec. 23, 1994, Texas Instruments.
Design of Portable Systems, Chandrakasan et al., Custom Integrated Circuit Conference, IEEE 1994.
A Low Power 16 by 16 Multiplier Using Transition Reduction Circuitry, Lemonds et al., IWLPD Workshop Proceedings, Texas Instruments, 1994.
Delay Balanced Multipliers for Low Power/Low Voltage DSP Core, Sakuta et al.,Texas Instruments, 1991 IEEE.
The Metaflow Architecture, Popescu et al., Metaflow Technologies, Inc., IEEE Micro 1991.

(List continued on next page.)

*Primary Examiner*—Emmanuel L. Moise
*Attorney, Agent, or Firm*—Flehr Hohbach Test Albritton & Herbert LLP

[57] ABSTRACT

The present invention contemplates an improved multiplier circuit and method for reducing power consumption by reducing the number of transitions to the input of the multiplier. Each input to the multiplier is fixed for as long as possible by reordering the sequence of the multiplications to take advantage of duplicate input values. The intermediate results of each multiplication are stored in separate accumulators to obtain the final resultants. Power consumption is further reduced through a reduction in the number of transitions on the data bus linking the multiplier and the data register file containing the accumulators.

12 Claims, 5 Drawing Sheets

OTHER PUBLICATIONS

Circuit and Architecture Trade-offs for High Speed Multiplication, Song et al., IEEE Journal of Solid State Circuits, vol. 26, No. 9, Sep. 1991.

Contemporary Logic Design, Chapter 5, Randy Katz, The Benjamin/Cummings Publishing Company, Inc. 1994.

Overview of SHARC Digital Signal Processor ADSP–2106X, SHARC Hardware 1996.

Digital Signal Processing Fundamentals, D. Koenig; 1992 National Instruments Corporation.

AT&T DSP3210, High Speed Number Crunching, Jan. 1996.

DSP Processors and Cores: The Options Multiply, Jeff Bier; Focus Report, Jul. 1995.

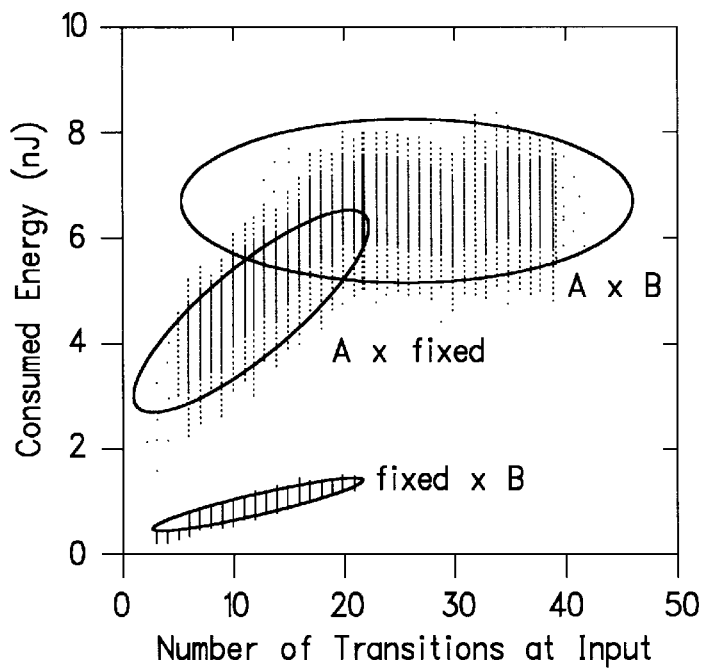
FIG. 4
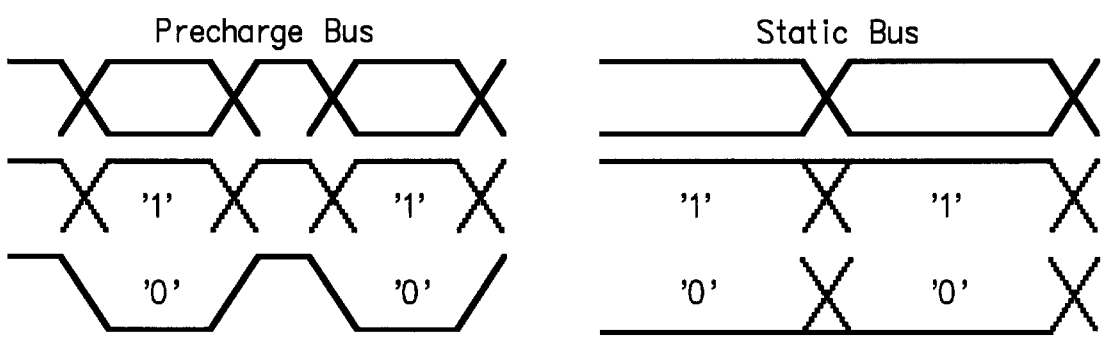
FIG. 6A
FIG. 6B

METHOD AND APPARATUS FOR REDUCING THE POWER CONSUMPTION IN A PROGRAMMABLE DIGITAL SIGNAL PROCESSOR

FIELD OF THE INVENTION

The present invention relates in general to multiplier circuits in digital signal processors, and in particular to reducing the power consumption of multiplier circuits in a programmable digital signal processor by controlling the operand inputs of the multiplier.

BACKGROUND OF THE INVENTION

In recent years, the demand for mobile or portable electronic devices of all sorts has grown tremendously. Because of advances in microelectronic circuitry sizes and battery technology, portable applications have grown from conventional low performance products such as wrist watches and calculators to high performance products such as notebook computers, personal digital assistants, camcorders and cellular telephones. The versatile functionality of high performance portable devices typically requires high computation speeds, however with low power consumption.

Reducing power consumption in portable devices translates directly into longer operational time while decreasing the size and weight of the batteries. In addition, reducing power consumption also means reduced heat in the integrated circuitry. For both portable and non-portable devices, reduced heat allows for more transistors to be integrated into a single chip or on a multichip module. This allows increased functionability in a smaller package, which is particularly important in voice/video communications and multimedia applications. Moreover, reduced circuit heat allows for the use of less expensive packaging technology without suffering reliability. As can be appreciated, cost reduction is another important consideration in portable devices.

System designers of portable devices are increasingly using digital signal processors ("DSP"s) because of the DSP's ability to quickly process large amounts of "real world" numerical data. A DSP processes "real world" signals such as voice, image and video signals by converting these analog signals into their digital equivalents at discrete time intervals for processing in the digital domain. The result is an array of numerical values stored in memory, which can be repetitively processed at high speeds.

To reduce the power consumption of the DSP, many system designs have produced low-voltage versions and/or have added power management features to provide greater control over a processor's power consumption. Power management features available on some DSPs include:

Reduced voltage operation. Several DSPs are designed to operate on 3.3 volts. Some DSPs can operate at 3.0 volts as well.

"Sleep" or "idle" modes. Many DSPs provide power-down modes that turn off the clock to certain sections of the processor, reducing power consumption.

Programmable clock dividers. Some newer DSPs allow the processor's clock frequency to be varied under software control. System designers can use the minimum clock speed required for a particular task.

Peripheral control. Some DSPs allow the programmer to disable peripherals that are not in use.

Going a step further, system designers have attempted to reduce the number of process steps taken to complete certain functions within the DSP in order to save power. A lot of attention has been focused on the multiplier function of the DSP, because of the proportionately large amount of power consumed by the multiplier. For example, Booth encoding techniques are widely used to reduce the number of partial product addition steps in parallel and array multipliers. Adding delay circuits and flip-flops to reduce spurious transactions in the multiplier array have also been practiced.

However, the above stated methods assume that the switching activities at the multiplier inputs are given, and seek to minimize the internal switching activities based on this assumption. Accordingly, what is needed is method to reduce the power consumed by a DSP multiplier circuit that takes advantage of the power savings achieved through control of the operands provided to the multiplier inputs.

It is, therefore, an object of present invention to provide a multiplier circuit and method for reducing the power consumption of a DSP.

It is another object of the present invention to provide a multiplier circuit and method for reducing the heat dissipation of a DSP to increase its reliability and reduce integrated circuit packaging costs.

It is still another object of the present invention to accomplish to above-stated objects by utilizing a multiplier circuit and method which is simple in design and use, and economical to perform.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variation which may be apparent to those skilled in the art. Accordingly, the present invention resides in the novel methods, arrangements, combinations and improvements herein shown and described.

SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow those of ordinary skill in the art to make and use the inventive concepts will follow in later sections.

According to a broad aspect of the invention, an apparatus and method is disclosed for reducing the transitions to the inputs of a multiplier when performing a plurality of multiply and accumulate operations on separate pairs of operands to obtain separate outputs. The multiplier has at least a first and a second accumulator register coupled to the output of said multiplier. Briefly, the method includes the steps of:

(a) reordering the pairs of operands to be multiplied so that at least one operand remains unchanged between consecutive pairs of operands;

(b) loading the plurality of first pair of operands to the inputs of the multiplier;

(c) multiplying the first pair of operands together and storing the intermediate result in the first accumulator register;

(d) loading one operand from the plurality of second pairs of operands to the inputs of the multiplier. The second pair of operands has one operand identical to at least one operand of said first pair of operands. However, the operand which is loaded is the one which is not identical to either of the operands in said first pair of operands;

(e) multiplying the second pair of operands together and storing the intermediate result in the second accumulator register; and (f) repeating steps (b) through (e) until enough intermediate results are accumulated in the first and second accumulator registers to produce final outputs.

BRIEF DESCRIPTION OF THE DRAWINGS

FIG. 4 is a graphical representation of the relationship between power consumption and input transitions at different inputs of a multiplier circuit according to one embodiment of the present invention.

FIGS. 6a–b are timing diagrams of a communication bus showing the transitions for a precharged condition and a static condition, respectively.

DETAILED DESCRIPTION OF THE PREFERRED EMBODIMENTS OF THE INVENTION

The present invention contemplates an improved multiplier circuit and method for reducing power consumption by reducing the number of transitions to the input of the multiplier. By reordering the sequence of the multiplications to place duplicative operands consecutively, the separate inputs to the multiplier are fixed for as long as possible, significantly reducing power consumption. Power consumption is further reduced through a reduction in the number of transitions on the data bus linking the multiplier and the data register file.

Figure 1:
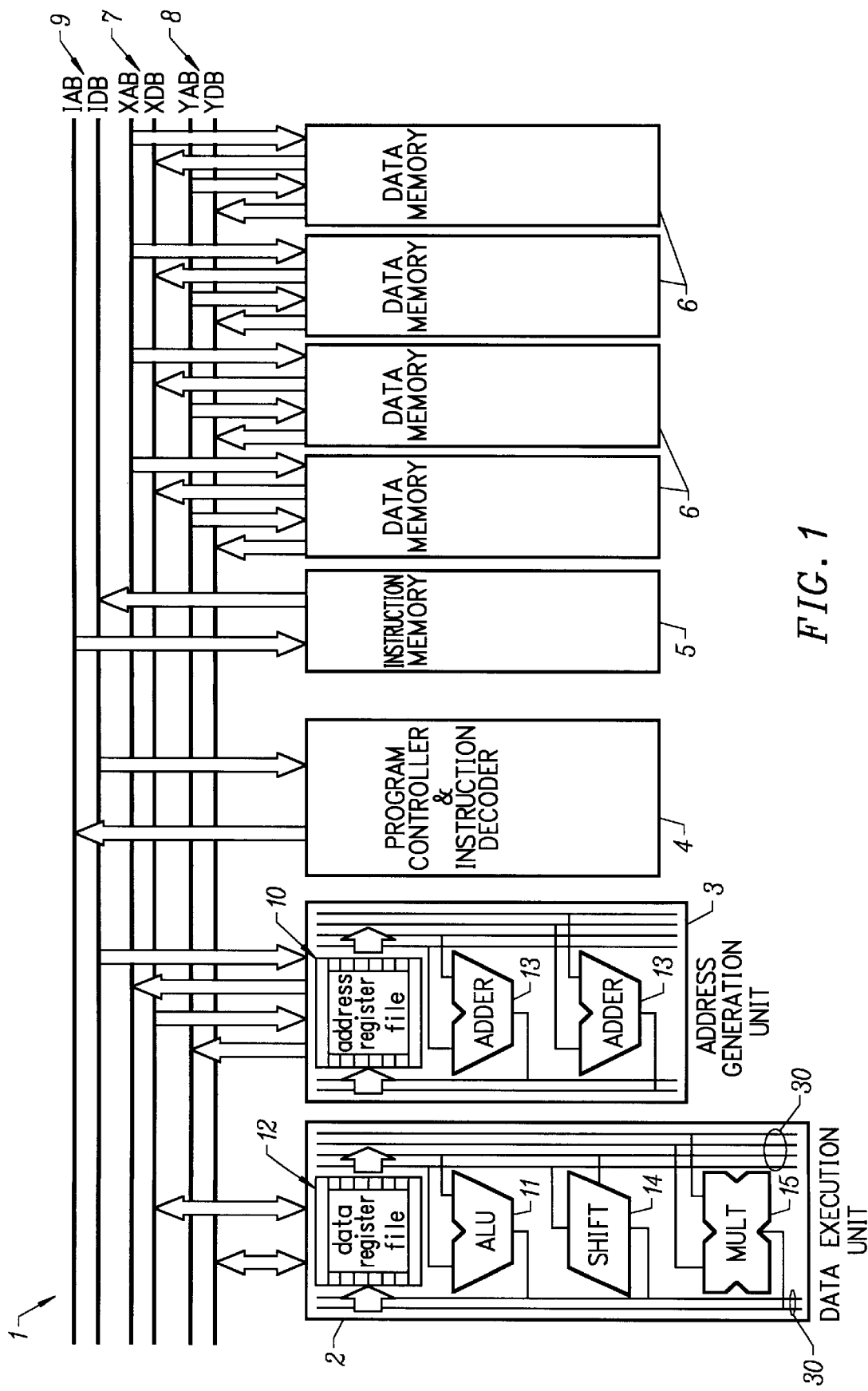
FIG. 1 is a block diagram of a general arrangement of a digital signal processor system.

Referring now to the drawings, wherein like numerals refer to like elements, there is disclosed in FIG. 1 broad aspects of a preferred embodiment of the invention. It is to be understood that the references to use of the multiplier circuit in a digital signal processor ("DSP"), related to but not forming part of the invention, are provided for illustrative purposes only. References to the DSP and its components are provided for ease in understanding how the present invention may be practiced in conjunction with known types of multiplier applications.

FIG. 1 discloses a general arrangement of a programmable digital signal processor ("DSP") core 1 as it may be used in an electronic device. It should be noted that the DSP 1 is not limited to a DSP core, which is designed to be incorporated into an ASIC design, and that a chip embodiment can be used with equal facility in the present invention. Moreover, the various components of the DSP 1 contemplated by the present invention may be implemented by direct electrical connection through customized integrated circuits, or a combination of circuitry and programming, using any of the methods known in the industry for providing the functions described herein without departing from the teachings of the invention. Those skilled in the art will appreciate that from the disclosure of the invention provided herein, commercial semiconductor integrated circuit technology would suggest numerous alternatives for actual implementation of the functions of the DSP 1 that would still be within the scope of the invention.

The arrangement shown in FIG. 1 is preferably for signal processing, but the functions described below may be applied in microprocessor systems of various configurations and applications. The DSP 1 may be any programmable device that can process large buffers of numerically intensive data by quickly executing repetitive multiplications, additions and accumulations. In the preferred embodiment, the DSP 1 is well suited for performing high volume applications such as fast fourier transforms, convolutions and digital filters.

According to one embodiment of the present invention, the DSP 1 contains, in pertinent part, a data execution unit 2, an address generation unit 3, and a program control unit 4. The DSP 1 also contains a program memory 5 which may be composed of read only memory (ROM), random access memory (RAM), and preferably a combination of both. In the preferred embodiment, the program memory 5 is a 1K by 24 bit ROM for storing 24-bit DSP instruction words therein. The DSP 1 also contains an array of data memories 6 composed of 512×24 bit RAM. In the preferred embodiment, 2 kilo words of RAM is provided for data storage.

The data execution unit 2, the address generation unit 3, the program control unit 4, the program memory 5 and the array of data memories 6 are all interconnected via a plurality of address and data busses having suitable bus interfaces and switching logic controlled by the DSP 1 for transmitting address information and data within the DSP 1. The DSP 1 incorporates the Harvard architecture by using separate internal busses for data and instructions, which include parallel address/data bus combinations X 7 and Y 8 for obtaining and transmitting data operands within the DSP 1. Also provided is instruction address/data bus I 9 for locating and fetching instruction codes.

In the preferred embodiment, address/data bus X 7 is a combination of an 18-bit address bus for communicating memory address information to memory address decoders (not shown for clarity) associated with the array of data memories 6 to locate the desired data, and a 24-bit data bus for communicating data operands to and from the data memories 6. The address/data bus Y 8 is identical to the address/data bus X 7 in that it is also a combination of an 18-bit address bus and 24-bit data bus. The duplicative bus structure allows the DSP 1 to feed two data operands (one data and one coefficient, usually stored in different pages of memory) to the data execution unit 2, at the same time an instruction code is fetched, and all within one cycle. As will be explained in detail below, in the present invention only one data operand is obtained during a single cycle and is used more than once during several multiplication operations within the data execution unit 2. Finally, instruction bus I 9 is also a combination of an 18-bit address bus and 24-bit data bus.

The data execution unit 2 further includes an arithmetic logic unit ("ALU") 11, a shifter 14, a multiplier 15, and an array of data registers 12. All of these elements are interconnected through internal busses 30 within the data execution unit 2.

The ALU 11 is a 56-bit general purpose arithmetic unit that operates on 56-bit data words, or decoded instruction words, to produce a 56-bit result. In addition to typical arithmetic operations such as addition and subtraction, the ALU 11 performs decision making Boolean operations, processing operations and logic operations such as AND, OR and EXCLUSIVE-OR on the data being input. For decision making operations, the ALU 11 compares which of two numbers is larger or smaller, whether a number equals zero, and whether a number is positive or negative.

The ALU 11 works in conjunction with a number of registers in the data register file 12 for temporarily storing data, on which logical and mathematical operations are performed. In a preferred embodiment of the present invention, the data register file 12 contains at least two and preferably more accumulator registers and several general purpose registers. The data register file 12 contains at least eight registers (0–7). The output of ALU 11 is stored in at least one accumulator register in the data register file 12.

The shifter 14 is a 56-bit barrel shift register which can perform logical and arithmetic shift operations, including rotate operations in left or right directions. The capabilities of the shifter 14 enable the DSP 1 to perform functions such as, for example, numerical scaling, bit extraction, and extended arithmetic, as are commonly practiced in the industry.

In the address generation unit 3, a combination of 18-bit address registers 10 and two adders 13 are contained therein. These address registers 10 operate with the use of adders 13 in order to access all of the addresses in the data memories 6. The address registers 10 include source address and destination address registers, a pointer register, and several interrupt registers. In addition, the address registers 10 may include registers for establishing memory boundaries and for handling address branches, such as, for example, base address registers, boundary registers, jump address registers, etc.

Figure 2:
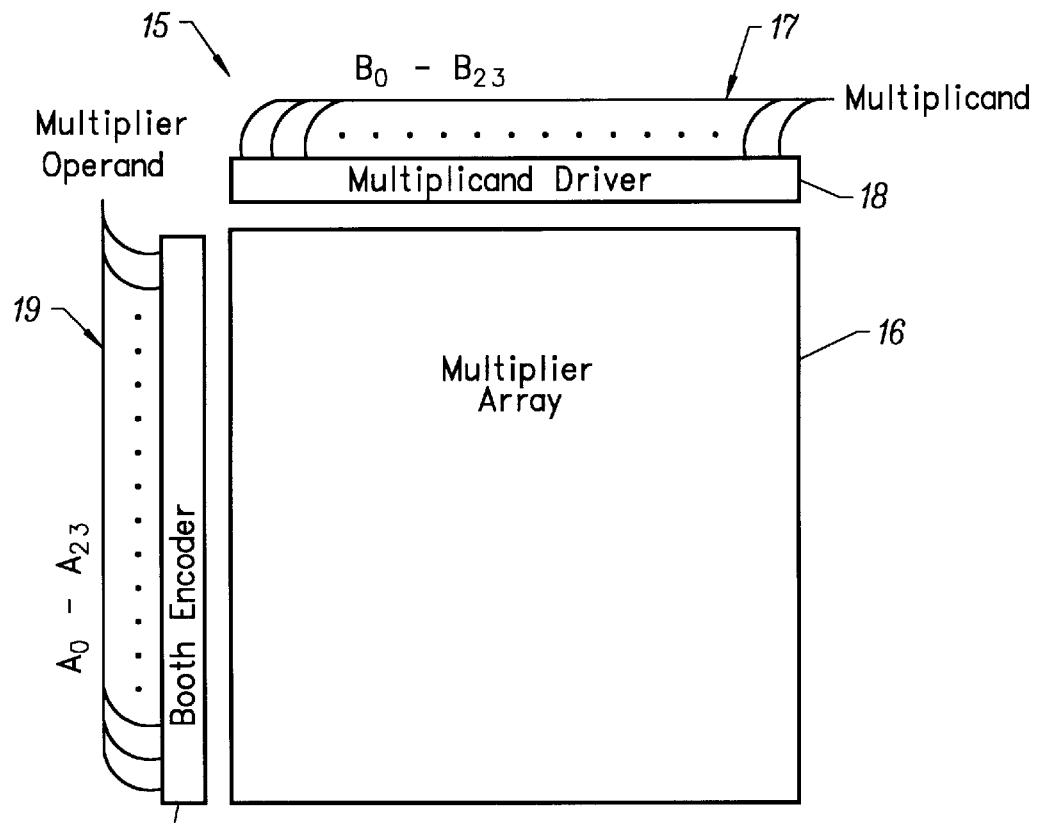
FIG. 2 is a block diagram of a multiplier circuit according to one embodiment of the present invention.

The multiplier 15, which is shown in greater detail in FIG. 2, performs 24×24 bit 2s complement multiplication with a 48 bit result in a single instruction cycle. The multiplier 15 contains an array of adders 16 constructed in dynamic/static logic. A 24 bit multiplicand 17 is provided, from the data bus of either the X 7 address/data bus or the Y 8 address/data bus, to the array 16 through a multiplicand driver 18 which acts as a register to temporarily store the multiplicand 17. The other input to the multiplier 15, typically provided from the data bus of either the X 7 address/data bus or the Y 8 address/data bus or in some cases from an instruction word (e.g., the multiply immediate instruction), is a 24 bit multiplier operand 19 that is applied to a set of Booth encoders 20 which produce a set of outputs having two of the following five functions: shift or no shift; add, subtract or zero.

The Booth encoder 20 reduces the number of partial products that the multiplier 15 would have to do in a classic multiplication procedure by approximately one-half through an algorithm that treats 2 bits of the multiplier each time (2 Radix), instead of one. The Booth encoder 20 first multiplies the 2 least significant bits of the multiplier operand 19 with the multiplicand 17 producing a partial product. Next, the following 2 bits of the multiplier operand 19 are multiplied with the multiplicand 17 to create another partial product, and so on until all of the bits of the multiplier operand 19 are used. The partial products are summed together to produce the resultant.

In parallel with the multiplication operation of a typical multiplier circuit, the multiplier operand input (also referred to as the "A" input) and the multiplicand input (also referred to as the "B" input), can each be loaded with a new value before the next multiplication. For example, a conventional finite impulse response filter ("FIR") operation for a DSP requires that one output be calculated at a time. The mathematical expression representative of obtaining the output (Y) of, for example, a 3-tap FIR filter is $$Y(k) = \sum_{i=0}^{2} Ci\, X(k-i)$$

This produces the following order of calculation:

$$Y(n) = C0\, X(n) + C1\, X(n-1) + C2\, X(n-2)$$
$$\qquad\quad [1] \qquad\qquad [2] \qquad\qquad [3]$$

$$Y(n+1) = C0\, X(n+1) = C1\, X(n) + C2\, X(n-1)$$
$$\qquad\quad [4] \qquad\qquad [5] \qquad\qquad [6]$$

$$Y(n+2) = C0\, X(n+2) + C1\, X(n+1) + C2\, X(n)$$

in which the bracketed [ ] number indicates the sequence of inputs to the multiplier.

First, output Y(n) is calculated. This step requires three multiplications and two additions. The C0 X(n) multiplication is first performed, with the result stored in the accumulator. Then the C1 X(n−1) multiplication is performed with the result added to the value already in the accumulator. The C2 X(n−2) multiplication is then performed, with its result added to the accumulator. The accumulator now contains the output Y(n). This output value may be stored in data memory 6 or used in a DSP application as is commonly done. The calculation of Y(n) is followed by the calculation of Y(n+1), which likewise requires three multiplications and accumulations in a similar sequence.

Figure 3A:
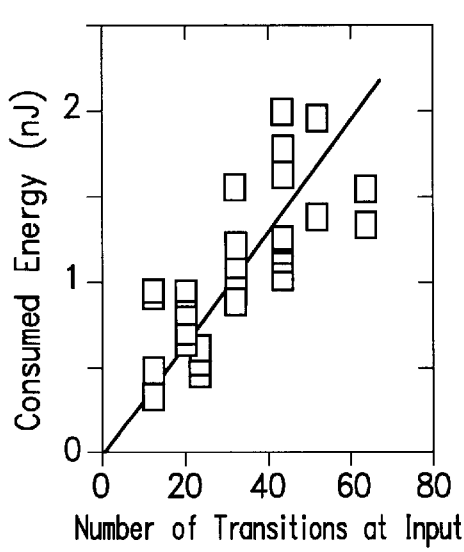
FIGS. 3a–b are graphical representations of the relationship between power consumption and input transitions for components of a digital signal processor.
Figure 3B:
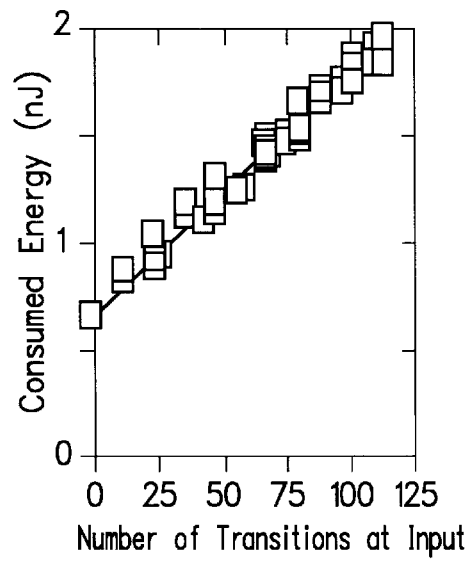

As can be seen, by following this conventional order of calculation, the multiplier operand (A) and multiplicand (B) inputs to the multiplier circuit are changed for each and every multiplication during the calculation of each Y output. Each input transition at the multiplier input is at the expense of the energy available to the circuit. FIGS. 3a and 3b show the near linear relationship between the energy consumed and the number of transitions to the inputs of, for example, the DSP adder and data register file, respectively. The greater the number of input transitions, the greater the amount of energy consumed.

In FIG. 4, the relationship of power consumption to input transitions to the multiplier 15 according to the present invention is shown. The uppermost encircled area of data points represents the power consumed when the multiplier (A) and multiplicand (B) inputs are constantly changing, as in the manner that a typical multiplier circuit is operated. Also shown in FIG. 4 is the encircled area of data points when the multiplier 15 (A) input is fixed and, alternatively, when the multiplicand (B) input is fixed in accordance with the present invention. As can be appreciated from the graphical representations shown in FIG. 4, reducing the input transitions results in a direct reduction of the power expended by the multiplier 15.

One preferred embodiment of the present invention exploits the power savings achieved by reducing the switching activity at the input to the multiplier 15. The present inventors recognized that the switching activity depends on the sequence of the signals applied at the inputs of the multiplier 15. Accordingly, the present invention reduces power consumption by maintaining the same value at the multiplier 15 inputs for as long as possible. This is accomplished by changing the order of the partial calculations for obtaining intermediate results for each of the outputs Y(n), Y(n+1), etc. and storing the partial products of each multiplication in separate accumulators until the final output results are obtained.

Using, for example, the FIR calculation steps described above, the present invention calculates the consecutive outputs Y (n), Y(n+1), etc., in an interlaced arrangement that reduces the input switching activity by changing the sequence of the various multiplications to be executed for the different outputs. In the preferred embodiment, the sequence is arranged so that multiplications having at least one identical operand are performed consecutively to reduce transitions at the input. This sequence of steps in the FIR filter calculation according to the present invention is shown below:

$$Y(n) = C0\ X(n) + C1\ X(n-1) + C2\ X(n-2)$$
$$[2] \qquad\qquad [4] \qquad\qquad [6]$$

$$Y(n+1) = C0\ X(n+1) = C1\ X(n) + C2\ X(n-1)$$
$$[1] \qquad\qquad [3] \qquad\qquad [5]$$

$$Y(n+2) = C0\ X(n+2) + C1\ X(n+1) + C2\ X(n)$$

in which the bracketed [] number indicates the sequence of inputs to the multiplier 15.

This sequence shows that to keep the inputs constant for as long as possible, the multiplier 15 of the present invention first calculates the partial product of C0 X(n+1) and stores the intermediate result in a first accumulator. Then the multiplier 15 calculates the partial product C0 X(n), keeping the C0 multiplier input unchanged and storing the result in a second accumulator. Next, the partial product C1 X(n) is calculated. This operation involves changing only one input to the multiplier from C0 to C1. Because this result is part of the calculation of Y(n+1), it is added to the first accumulator. The partial product C1 X(n-1) is then obtained by the multiplier (note only one change to the multiplier inputs since C1 is the same for both multiplications), and the result is combined with the value in the second accumulator. The process is repeated until all of the Y outputs are calculated.

Advantageously, under the present method the C0 input value remains unchanged at the multiplier 15 input in steps 1 and 2. In steps 2 and 3, the X(n) value at one multiplier input remains unchanged. Similarly, in steps 3 and 4, the C1 input value stays constant. For each multiplication, one of the two inputs will be the same as in the previous multiplication. As can be understood, the power saving advantage of reducing the input transitions continues throughout the order of calculations using the preferred method.

In another embodiment of the present invention, a plurality of accumulator registers (more than the 2 accumulator embodiment disclosed above) are employed in the data register file 12. For each accumulator register, one output value (Y) can be calculated, such that for n accumulator registers, n x Y outputs can be calculated concurrently in an interlaced method. For example, in an embodiment having three accumulators, the output values Y(n), Y(n+1) and Y(n+2) can be calculated together in the following, order:

step (1): C0 X(n) step (4): C1 X(n–1) step (7): C2 X(n–2)
step (2): C0 X(n+1) step (5): C1 X(n) step (8): C2 X(n–1)
step (3): C0 X(n+2) step (6): C1 X(n+1) step (9): C2 X(n)

With this method, one input to the multiplier 15 is maintained constant for three multiplications (steps 1–3), significantly reducing the switching activity at that input. Likewise, in steps 4–6, the C1 input is unchanged for three multiplications, and in steps 6–9 the C2 input is unchanged.

Another embodiment of the present invention provides for the X(i) input to be fixed for as long as possible while changing the C(i) input. This method can be achieved in the following, order of steps:

step (4): C0 X(n) step (7): C1 X(n–1) step (9): C2 X(n–2)
step (2): C0 X(n+1) step (5): C1 X(n) step (8): C2 X(n–1)
step (1): C0 X(n+2) step (3): C1 X(n+1) step (6): C2 X(n)

To increase the power reduction further, one embodiment of the present invention employs the inventive method to maintain the multiplier operand (A) to be held constant for as many operations as possible, while changing the multiplicand operand. This means that the input to the Booth encoder 20 experiences the least amount of input transitions (see FIG. 4) for reducing power consumption.

Although some aspects of the invention are described in terms of schematic diagrams, the methodology of the present invention is best illustrated by the use of a process flowchart. Thus, to facilitate understanding of the operation of the data execution unit 2 of the present invention, an example of a power saving FIR program routine is set forth in FIG. 5. Referring to this figure, a detailed description of the process that incorporates the principles of the above described embodiment of the present invention will now be described.

In this process example, the data execution unit 2 is the two accumulator embodiment described above, for performing the output calculations of a K-tap FIR filter on a block of N input samples. The parameter "i" corresponds to the number of taps (K), the parameter "j" corresponds to the number of input (or output) samples (N), a0 and a1 represent the first and second accumulator respectively, and A and B are representative of the two inputs to the multiplier 15.

Figure 5:
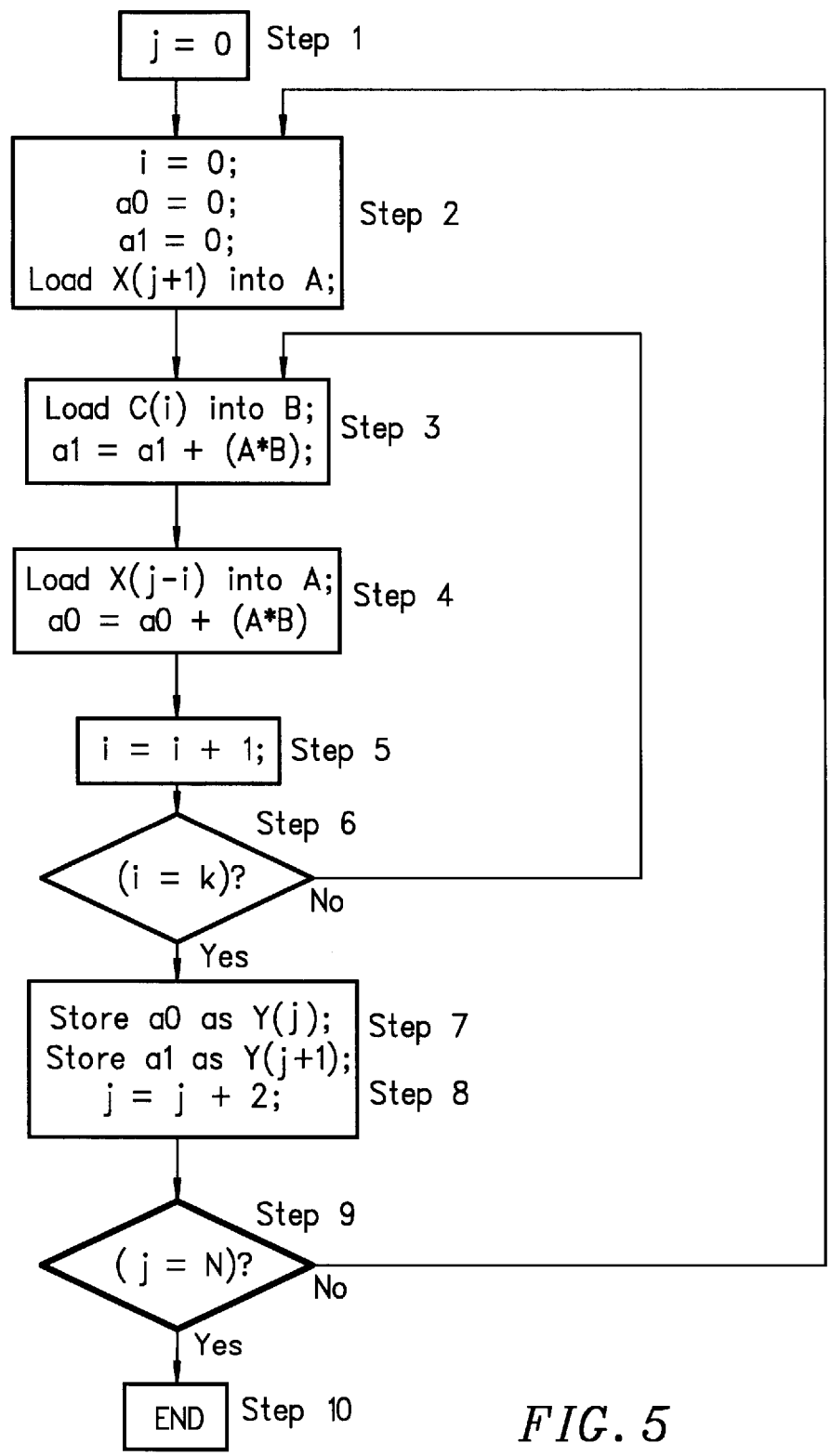
FIG. 5 is a flow chart diagram of the operation of one embodiment of the present invention.

In step 1 at the top of FIG. 5, the j counter is reset to zero. Similarly, in step 2, the i counter and both accumulators (a0, a1) are set to zero. Here, the initial operand value X(j+1) is loaded into one input (A) of the multiplier 15. In step 3, the operand value for C(i) is loaded into the other input (B) of the multiplier 15. A multiply and accumulate operation is performed in which the intermediate result is loaded into the second accumulator a1. Next, in step 4, the operand value X(j–1) is loaded into the A input of the multiplier 15, and without changing the operand at the B input of the multiplier 15, another multiply and accumulate operation is performed. This time the intermediate result is stored in the first accumulator a0.

After the first multiplication pass through, the i counter is incremented (step 5) and compared to K in Step 6. The multiplications and accumulations in steps 3 and 4 are repeated for the K loops, until all the intermediate results are accumulated into final resultants. At this point, accumulator a0 contains the output Y(j), and accumulator a1 contains the output Y(j+1) as outputs of the multiplication (step 7). Next, the j counter is incremented by 2 since two resultants are accumulated in each loop (step 8), and the outputs Y are calculated through the loop formed by steps 2–8 until all N outputs are produced (steps 9 and 10).

It should be noted that the present invention can be used with equal facility to reduce the power expended when the DSP 1 is performing matrix-matrix multiplication operations. For multiplying an M×N array matrix ("A") with an N×P array matrix ("B") to obtain an M×P array matrix ("C"), a conventional DSP 1 would multiply A[M,N] by B[N,P] and load each intermediate result into an accumulator. Naturally, both inputs to the multiplier would change with each partial product calculation until each output (Y) is obtained, resulting in a high power consumption (as depicted in the upper are (A×B) in FIG. 4). In this case, the DSP 1 would perform, for example, the following C-like program sequence:

```
for (i = 0, 1, 2, . . . M - 1)          {

/* calculate 1 output C[i,j] each time in the loop */ for (j = 0, 1, 2, . . . P - 1)          { c = 0;

for (k = 0, 1, 2, . . . N - 1)          { c = c + (A[i,k] * B[k,j]);

}

C[i,j] = c;

}

}
```

In the present invention, however, a power savings is achieved in a matrix-matrix multiplication because the partial products of multiple outputs (Y) are calculated in an interlaced maimer and accumulated in a plurality of accumulator registers in the data execution unit 2. At least two outputs are obtained at a time, for example C[i,j], C[i,j+1], using two accumulator registers c and d. In such a case, obtaining the outputs, for example C[i,j], C[i,j+1], can be defined by:

$$C[i,j] = \sum_{k=0}^{N-1} A[i,k] * B[k,j]$$

$$C[i,j+1] = \sum_{k=0}^{N-1} A[i,k] * B[k,j+1]$$

For this example, the data execution unit 2 of the present invention would undertake the following method steps, expressed in a C-like program sequence as:

```
for (i = 0, 1, 2, . . . M - 1)          {

/* calculate 2 outputs C[i,j] and C[i,j + 1] each time in the loop */ for (j = 0, 2, 4, . . . P - 2)   { c = 0;

d = 0;

for (k = 0, 1, 2, . . . N - 1)          { c = c + (A[i,k] * B[k,j]);

d = d + (A[i,k] * B[k,j + 1]);

}

C[i,j] = c;

C[i,j + 1] = d;

}

}
```

The above method performs a row-wise interlaced accumulation, i.e., it calculates two output elements which are adjacent to each other in the same row. It is also possible to perform with the present invention a column-wise interlaced accumulation, i.e., to calculate the two output elements C[i,j] and C[i+1,j] which are adjacent to each other in the same column in an interlaced manner. This applies to the case when the number of columns 'P' of the output matrix is a multiple of 2. If this 'P' is not a multiple of 2, then the present method can be used to calculate the first P−1 columns of the output matrix, i.e., calculate the elements C[i,j] for i=0 to M−1, and j=0 to P−2. The elements of the last column C[i,P−1] for i=0 to M−1, can be calculated using a conventional matrix multiplication method. Alternately, the last column elements can be calculated using a column-wise interlaced accumulation method.

In an embodiment of the present invention having a plurality of accumulator registers, for example 3 accumulator registers, then 3 output values can be calculated in parallel. For example, in the row-wise accumulation method the outputs C[i,j], C[i,j+1], C[i,j+2] can be calculated in an interlaced manner.

In yet another embodiment of the present invention, the internal bus of the data execution unit 2 between the data register file 12 and the inputs to the multiplier 15 are maintained in a static state, as opposed to a precharged state, in order to retain the previous input operand without any transitions. FIGS. 6a–b show the difference in the transition activities when the internal bus 30 of the present invention is in a precharge state, and when the bus 30 is in a static state. In the precharged condition (FIG. 6a), the bus is charged to a high state at the start of every cycle and is conditionally discharged, depending on the value transmitted on the bus. As shown in FIG. 6a, this results in a high degree of switching activity, and therefore a large amount of power consumed. Conversely, in the static state (FIG. 6b), the bus makes transitions between high and low states only when needed, as determined by the flow of data operands. Reduction in transitions at the multiplier 15 inputs reduces switching activity on the internal bus 30, and therefore power consumption within the data execution unit 2. By maintaining the internal bus static, the present invention avoids surplus transitions in about 50% of the operations.

Figure 7:
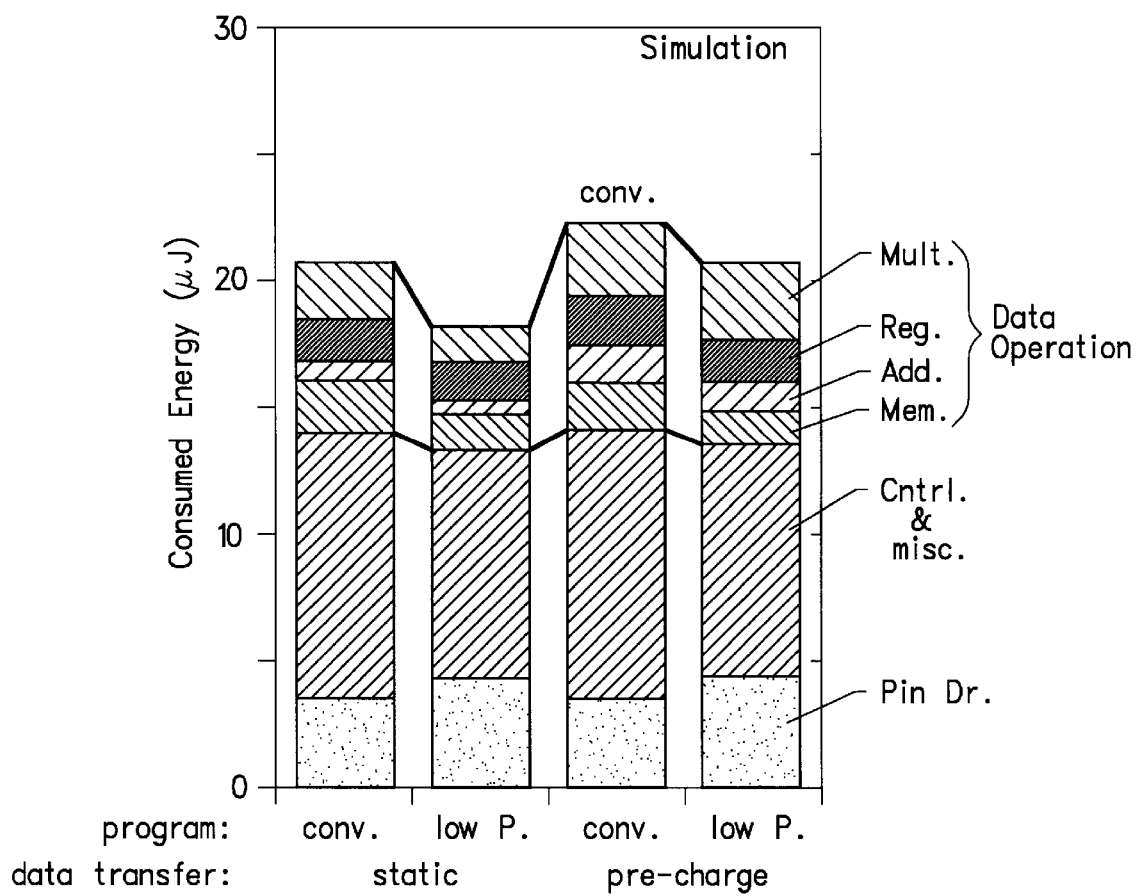
FIG. 7 is a bar graph showing the power reductions in a digital signal processor, according to several embodiments of the present invention.

FIG. 7 is a bar graph representation of the alternative power consumption of the DSP 1 using a conventional method of calculating FIR output values, and using the reordered input method of the present invention when the internal bus is in a static state. Similarly, FIG. 7 shows the power consumption of the DSP 1 using a conventional method of calculating FIR output values when the internal bus 30 is precharged, and using the reordered input method of the present invention when the internal bus 30 is precharged. As can be appreciated, the power savings in the multiplier 15 is nearly 40% over conventional practices when the bus 30 is maintained static and the multiplier 15 inputs are maintained constant for at least two multiplications. Overall DSP 1 power consumption is reduced by about 19% in the present invention.

Although the present invention has been described in detail with particular reference to preferred embodiments thereof, it should be understood that the invention is capable of other and different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed:

1. A method of reducing the power consumption in a programmable digital signal processor having a multiplier by reducing the transitions to the inputs of said multiplier when performing a plurality of multiply and accumulate operations on a plurality of pairs of operands corresponding to separate sets of multiply and accumulate operations having n separate outputs, wherein said multiplier has a plurality of accumulator registers coupled to the output of said multiplier, each accumulator register corresponding to each set of multiply and accumulate operations, said method comprising the steps of:

(a) reordering the pairs of operands from the separate sets of multiply and accumulate operations so that at least one operand remains unchanged between a plurality of consecutive pairs of operands;

(b) loading a pair of operands from said reordered pairs of operands to the inputs of the multiplier;

(c) multiplying said pair of operands loaded at step (b) together and storing the result as an intermediate result in the corresponding accumulator register; and (d) repeating steps (b) and (c) so as to add the intermediate results to the results already stored in said plurality of accumulator registers, until the intermediate results are accumulated so as to produce n final outputs.

2. A method of reducing the power consumption in a programmable digital signal processor having a multiplier according to claim 1 wherein said multiplier includes a Booth encoder coupled to one input of said multiplier, said method further comprising the step of reordering said pairs of operands such that the inputs to the Booth encoder are maintained constant for a plurality of consecutive pairs of operands.

3. A method of reducing the power consumption in a programmable digital signal processor having a multiplier according to claim 1 wherein said multiplier includes more than two accumulator registers for storing the intermediate results of a plurality of inputs in an interlaced sequence when generating a plurality of separate outputs.

4. A method of reducing the power consumption in a programmable digital signal processor having a multiplier according to claim 1 wherein said multiplier includes internal buses for transmitting data therethrough, said method further includes the step of maintaining said internal buses in a static charge condition such that said internal buses switch from a high charge state to a low charge state only as required by the data transmitted across said internal bus.

5. A method of reducing the power consumption in a programmable digital signal processor having a multiplier, when performing matrix—matrix multiplication on a plurality of pairs of operands corresponding to n separate sets of multiply and accumulate operations having n separate outputs, wherein said multiplier has a plurality of accumulator registers coupled to the output of said multiplier, each accumulator register corresponding to each set of multiply and accumulate operations, said method comprising the steps of:

(a) reordering the pairs of operands from the separate sets of multiply and accumulate operations so that at least one operand remains unchanged between a plurality of consecutive pairs of operands;

(b) loading a pair of operands from said reordered pairs of operands to the inputs of the multiplier;

(c) multiplying said pair of operands loaded at step (b) together and storing the result as an intermediate result in the corresponding accumulator register; and (d) repeating steps (b) and (c) so as to add the intermediate results to the results already stored in said plurality of accumulator registers, until the intermediate results are accumulated such that n final outputs are completely calculated.

6. A method of reducing the power consumption in a programmable digital signal processor having a multiplier, when performing matrix - matrix multiplication according to claim 5, wherein said multiplier includes more than two accumulator registers for storing the intermediate results of a plurality of inputs in an interlaced sequence when generating a plurality of separate outputs.

7. A method of reducing the power consumption in a programmable digital signal processor having a multiplier according to claim 5 wherein said multiplier includes a Booth encoder coupled to one input of said multiplier, said method further comprising the step of reordering said pairs of operands such that the inputs to the Booth encoder are maintained constant for a plurality of consecutive pairs of operands.

8. A method of reducing the power consumption in a programmable digital signal processor having a multiplier according to claim 5 wherein said multiplier includes internal buses for transmitting data therethrough, said method further includes the step of maintaining said internal buses in a static charge condition such that said internal buses switch from a high charge state to a low charge state only as required by the data transmitted across said internal buses.

9. A programmable digital signal processor apparatus having a multiplier, wherein said multiplier has a plurality of accumulator registers coupled to the output of said multiplier for storing separate outputs, each accumulator register corresponding to a separate set of multiply and accumulate operations of pairs of operands, said apparatus comprising:

a processor means for performing decision making, control operations and reordering of the pairs of operands from the separate sets of multiply and accumulate operations so that at least one operand remains unchanged between a plurality of consecutive pairs of operands;

an array of memory storage means having address inputs and data inputs and outputs, for storing the separate sets of multiply and accumulate operations in different locations within said memory storage means;

an address generation means having address outputs coupled to the address inputs of said memory storage means, for generating addresses to access different locations within said memory storage means; and an interface means having address inputs connected to the address outputs of said address generation unit.

10. A programmable digital signal processor apparatus having a multiplier according to claim 9, wherein each of said registers stores and accumulates the intermediate results of said multiplier for each separate set of multiply and accumulate operations.

11. A programmable digital signal processor apparatus having a multiplier according to claim 10, wherein said multiplier includes internal buses having a high charge condition and a low charge condition for reducing power consumption when data is not being transmitted therethrough.

12. A programmable digital signal processor apparatus having a multiplier according to claim 9, further comprising a plurality of external storage devices coupled to said processor.

* * * * *